United States Patent
Xu et al.

(10) Patent No.: US 12,483,367 B2
(45) Date of Patent: Nov. 25, 2025

(54) SECONDARY CELL ACTIVATION METHOD, APPARATUS, DEVICE, AND STORAGE MEDIUM

(71) Applicant: GUANGDONG OPPO MOBILE TELECOMMUNICATIONS CORP., LTD., Dongguan (CN)

(72) Inventors: Jing Xu, Dongguan (CN); Wenhong Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 325 days.

(21) Appl. No.: 18/091,927

(22) Filed: Dec. 30, 2022

(65) Prior Publication Data
US 2023/0224113 A1    Jul. 13, 2023

Related U.S. Application Data

(63) Continuation of application No. PCT/CN2020/122981, filed on Oct. 22, 2020.

(51) Int. Cl.
*H04L 5/00* (2006.01)

(52) U.S. Cl.
CPC .................. *H04L 5/0048* (2013.01)

(58) Field of Classification Search
CPC ..... H04L 5/0048; H04L 5/001; H04L 5/0053; H04L 5/0098; H04L 5/0096; Y02D 30/70;
(Continued)

(56) References Cited

U.S. PATENT DOCUMENTS 11,979,833 B2 * 5/2024 Noh .................. H04W 72/54
2013/0188619 A1 7/2013 Dinan
(Continued)

FOREIGN PATENT DOCUMENTS

CN  109391986 A  2/2019
CN  110149178 A  8/2019
(Continued)

OTHER PUBLICATIONS

International Search Report issued in International application No. PCT/CN2020/122981, mailed Jul. 9, 2021, 4 paes.
(Continued)

*Primary Examiner* — Jay P Patel
(74) *Attorney, Agent, or Firm* — BAYES PLLC

(57) ABSTRACT

The present application relates to the field of mobile communication. Disclosed are a secondary cell activation method, an apparatus, a device, and a storage medium. The method comprises: receiving a reference signal activation signaling, the reference signal activation signaling being used for activating a reference signal, the reference signal being used for activation of a secondary cell; receiving the reference signal on the basis of the reference signal activation signaling, and activating the secondary cell. Obviated is the need to wait further to receive a first SSB to activate the secondary cell, thus reducing the length of time spent on waiting to receive the first SSB, reducing the delay in activating the secondary cell, and increasing the accuracy of activating the secondary cell.

12 Claims, 3 Drawing Sheets

(58) Field of Classification Search
CPC . H04W 72/04; H04W 72/23; H04W 72/0446; H04W 72/231; H04W 72/232
See application file for complete search history.

(56) References Cited

U.S. PATENT DOCUMENTS

| | | | |
|---|---|---|---|
| 2019/0356444 A1 | 11/2019 | Noh et al. | |
| 2020/0305168 A1* | 9/2020 | Liou | H04L 5/0098 |
| 2020/0413478 A1* | 12/2020 | Si | H04W 72/535 |
| 2021/0135821 A1* | 5/2021 | Guan | H04L 5/0048 |
| 2021/0136532 A1* | 5/2021 | Liu | H04W 4/06 |
| 2022/0086676 A1* | 3/2022 | Ai | H04L 1/0026 |
| 2022/0110085 A1* | 4/2022 | Khoryaev | H04L 5/0051 |
| 2022/0173786 A1* | 6/2022 | Cui | H04B 7/088 |
| 2023/0040353 A1* | 2/2023 | He | H04L 5/001 |
| 2023/0047929 A1* | 2/2023 | Matsumura | H04L 5/001 |
| 2023/0132666 A1* | 5/2023 | Zhang | H04L 5/0053 370/329 |
| 2023/0179260 A1* | 6/2023 | Abdelghaffar | H04W 72/23 370/329 |
| 2023/0179370 A1* | 6/2023 | Wang | H04L 5/0094 370/329 |
| 2023/0224833 A1* | 7/2023 | Wang | H04L 5/0098 370/350 |
| 2023/0396385 A1* | 12/2023 | Kwak | H04L 5/0094 |
| 2023/0422165 A1* | 12/2023 | Sun | H04L 5/001 |
| 2024/0014870 A1* | 1/2024 | Ben Hadj Fredj | H04B 7/0639 |
| 2024/0015740 A1* | 1/2024 | Xiao | H04W 72/1273 |
| 2025/0070937 A1* | 2/2025 | Kwak | H04L 5/0048 |
| 2025/0151027 A1* | 5/2025 | Nam | H04W 72/0446 |

FOREIGN PATENT DOCUMENTS

| | | |
|---|---|---|
| CN | 110166192 A | 8/2019 |
| CN | 110475364 A | 11/2019 |
| CN | 110149178 B | 9/2020 |
| EP | 4586712 A2 * | 7/2025 |
| JP | 2022-517478 A | 3/2022 |
| JP | 2022-520044 A | 2/2024 |
| WO | 2019139769 A1 | 7/2019 |
| WO | 2019154268 A1 | 8/2019 |
| WO | 2019225898 A1 | 11/2019 |
| WO | 2020034440 A1 | 2/2020 |
| WO | 2020167896 A1 | 8/2020 |
| WO | 2020/201124 A1 | 10/2020 |
| WO | 2020191764 A1 | 10/2020 |

OTHER PUBLICATIONS

Written Opinion of the International Searching Authority issued in International application No. PCT/CN2020/122981, mailed Jul. 9, 2021, 9 pages.
3GPP TS 38.212 V16.0.0 (Dec. 2019), "3rd Generation Partnership Project; Technical Specification Group Radio Access Network; NR; Multiplexing and channel coding (Release 16)", 141 pages.
3GPP TS 38.213 V16.0.0 (Dec. 2019), "3rd Generation Partnership Project; Technical Specification Group Radio Access Network; NR; Physical layer procedures for control (Release 16)", 145 pages.
3GPP TSG RAN Meeting #86 RP-193249, Sitges, Spain, Dec. 9-12, 2019, New WID on further enhancements on Multi-Radio Dual-Connectivity, Source: Huawei, Agenda Item: 9.1.2, 5 pages.
Extended European Search Report issued in corresponding European application No. 20958239.4, mailed Oct. 30, 2023.
First Office Action issued in corresponding Indian application No. 202327030629, mailed Nov. 2, 2023.
Source: Ericsson; Title: Reduced Latency SCell Activation 3GPP TSG-RAN WG1 #102-e R1-2006673 eMeeting, Aug. 17-28, 2020.
Source: Qualcomm Incorporated; Title: Discussion on fast SCell activation based on Aperiodic TRS (A-TRS) 3GPP TSG RAN WG2 Meeting #107 R2-1908686 Prague, Czech, Aug. 26-30, 2019.
Communication pursuant to Article 94(3) EPC issued in corresponding European Application No. 20958239.4, mailed Jul. 30, 2024, 5 pages.
Notice of priority examination of patent application issued in corresponding Chinese Application No. 202311349266.2, mailed Sep. 20, 2024, 8 pages.
Notice of Reasons for Refusal issued in corresponding Japanese Application No. 2023-524471, mailed on Sep. 6, 2024, 11 pages.
First Office Opinion Notice issued in corresponding Chinese Application No. 202311349266.2, mailed Oct. 10, 2024, 12 pages.
"Remaining issues on TRS", Source: vivo, Agenda Item: 7.1.2.3.6, 3GPP TSG-RAN WG1 NR #93, R1-1806053, Busan, Korea, May 21-25, 2018, 3 pages.
Hearing Notice issued in corresponding India Application No. 202327030629, mailed on Jan. 17, 2025, 2 pages.
Request for the Submission of an Opinion issued in corresponding Korean Application No. 10-2023-7015911, mailed on Sep. 5, 2025, 10 pages.
Summary#2 of efficient SCell activation/de-activation mechanism of NR CA, Agenda Item: 8.13.3, Source: Moderator (Huawei), 3GPP TSG RAN WG1 #102-e R1-2007423, E-Meeting, Aug. 17-28, 2020, 27 pages.
Details on TRS design, Agenda Item: 6.2.3.6, Source: Ericsson, 3GPP TSG-RAN WG1 Meeting #NR3 R1-1716375, Nagoya, Japan, Sep. 18-21, 2017, 35 pages.

* cited by examiner

SECONDARY CELL ACTIVATION METHOD, APPARATUS, DEVICE, AND STORAGE MEDIUM

TECHNICAL FIELD

The present application relates to the field of mobile communications, and in particular, to a method, apparatus, device for activating a secondary cell and a storage medium.

BACKGROUND

In a New Radio (NR) system, a carrier aggregation manner can be used to support a relatively large bandwidth, and a terminal can receive data or send data from a plurality of cells of the carrier aggregation. The aggregated plurality of cells include one primary cell and a plurality of secondary cells, and the initial state of the secondary cell is a deactivated state, thus the terminal needs to activate the secondary cell to receive or send data.

At present, the terminal receives the Media Access Control (MAC) Control Element (CE) sent by the network device for activating the secondary cell, returns a confirmation message indicating that the MAC CE has been received, receives the first Synchronization Signal Block (SSB) after a preset duration after returning the confirmation message, parses the SSB, determines to use the secondary cell, and then activates the secondary cell. However, because the terminal waits for a long delay to receive the SSB, activation of the secondary cell takes a long time.

SUMMARY

Embodiments of the present application provide a method, apparatus, device for activating a secondary cell, and a storage medium, which reduce the waiting time for receiving the first SSB, thereby reducing the time delay for activating the secondary cell, and improving the accuracy of activating the secondary cell. The technical solutions are as follows.

According to an aspect of the present application, a method for activating a secondary cell is provided, which is applied to a terminal, and the method includes:
receiving a reference signal activation signaling, where the reference signal activation signaling is used for activating a reference signal, and the reference signal is used for activation of the secondary cell; and
receiving the reference signal based on the reference signal activation signaling, and activating the secondary cell.

According to an aspect of the present application, a method for activating a secondary cell is provided, which is applied to a network device, and the method includes:
sending a reference signal activation signaling, where the reference signal activation signaling is used for activating a reference signal, and the reference signal is used for activation of the secondary cell; and
sending the reference signal based on the reference signal activation signaling.

According to an aspect of the present application, an apparatus for activating a secondary cell is provided, which is arranged in a terminal, and the apparatus includes:
a receiving module, configured to receive a reference signal activation signaling, where the reference signal activation signaling is used for activating a reference signal, and the reference signal is used for activation of the secondary cell;
the receiving module being configured to receive the reference signal based on the reference signal activation signaling; and
an activation module, configured to activate the secondary cell.

According to an aspect of the present application, an apparatus for activating a secondary cell is provided, which is arranged in a network device, and the apparatus includes:
a sending module, configured to send a reference signal activation signaling, where the reference signal activation signaling is used for activating a reference signal, and the reference signal is used for activation of the secondary cell;
where the sending module is configured to send the reference signal based on the reference signal activation signaling.

According to one aspect of the present application, a terminal is provided, the terminal including: a processor; a transceiver connected to the processor; a memory for storing executable program codes of the processor; where the processor is configured to load and execute the executable program codes to cause the terminal to implement the method for activating a secondary cell as described in the above aspects.

According to one aspect of the present application, a network device is provided, the network device including: a processor; a transceiver connected to the processor; a memory for storing executable program codes of the processor; where the processor is configured to load and execute the executable program code to cause the network device to implement the method for activating a secondary cell as described in the above aspects.

According to an aspect of the present application, a computer-readable storage medium is provided, and executable program codes are stored in the readable storage medium, and the executable program codes are loaded and executed by the processor to implement the method for activating a secondary cell as described in the above aspects.

The technical solutions provided by the embodiments of the present application include at least the following beneficial effects:
with the method, apparatus, device, and storage medium provided by the embodiments of the present application, the terminal can receive the reference signal based on the reference signal activation signaling, and then activate the secondary cell, without waiting for receiving the first SSB and then activating the secondary cell, which reduces the delay of activating the secondary cell and improves the accuracy of activating the secondary cell.

BRIEF DESCRIPTION OF THE DRAWINGS

In order to illustrate the technical solutions in the embodiments of the present application more clearly, the following briefly introduces the drawings that are used in the description of the embodiments. Obviously, the drawings in the following description are only some embodiments of the present application. For those of ordinary skill in the art, other drawings can also be obtained from these drawings without creative effort.

DETAILED DESCRIPTION

In order to make the objectives, technical solutions and advantages of the present application clearer, the embodiments of the present application will be further described in detail below with reference to the accompanying drawings.

It is understood that the terms "first", "second" and the like used in the present application may be used herein to describe various concepts, but these concepts are not limited by these terms unless otherwise specified. These terms are only used to distinguish one concept from another.

First, the terms involved in the embodiments of the present application are briefly introduced:

1. Carrier Aggregation:

By jointly scheduling and using resources on a plurality of component carriers, the NR system supports a relatively large bandwidth. Carrier aggregation can be divided into continuous carrier aggregation and discontinuous carrier aggregation according to whether the aggregated carriers are continuous in the spectrum. Carrier aggregation can be divided into intra-band carrier aggregation and inter-band carrier aggregation according to whether the frequency bands in which the aggregated carriers are located are the same.

The carriers of carrier aggregation include Primary Cell Component (PCC, primary carrier) and Secondary Cell Component (SCC, secondary carrier). There is only one PCC, and PPC is a carrier corresponding to the primary cell. PCC provides an RRC signaling connection, a Non-Access Stratum (NAS) function, or a security service, and so on. SCC provides additional radio resources. PCC and SCC are both serving cells. In the NR system, the maximum number of carriers through carrier aggregation is 5, and the maximum bandwidth after aggregation is 100 MHZ (megahertz), and the aggregated carriers all belong to the same base station.

Figure 1:
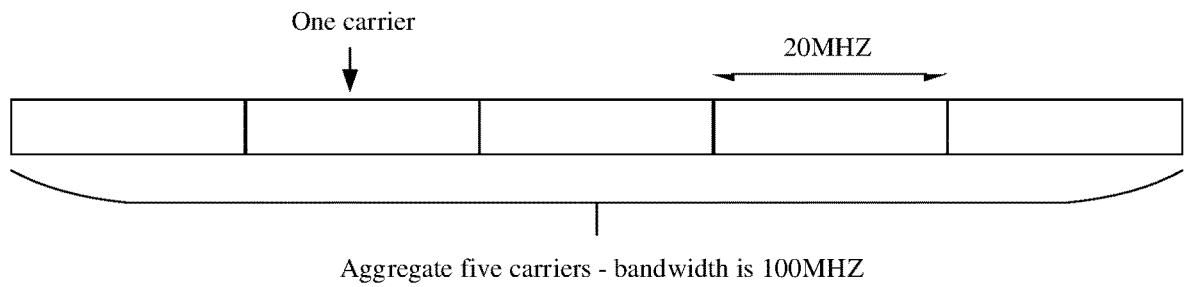
FIG. 1 shows a schematic diagram of carrier aggregation provided by an exemplary embodiment of the present application.

For example, as shown in FIG. 1, one carrier aggregation includes 5 carriers, the bandwidth of each carrier is 20 MHz, and the maximum bandwidth after aggregation is 100 MHz.

In a specific example, the carriers aggregated through carrier aggregation use the same cell radio network temporary identifier (C-RNTI), and the base station can ensure that the C-RNTI does not collide in the cell where each carrier is located. Since carrier aggregation includes asymmetric carrier aggregation and symmetric carrier aggregation, the aggregated carriers are required to include downlink, but may not include uplink.

2. Secondary Cell Activation:

The secondary cell is configured through Radio Resource Control (RRC) signaling, and the initial state of the secondary cell is a deactivated state. In this deactivated state, the secondary cell cannot receive or send data. The secondary cell needs to be activated, and the activated secondary cell can receive and send data.

3. Reference signal: the reference signal is TRS or CSI RS. Hereinafter, the reference signal will be described by taking the TRS as an example.

The TRS occupies symbols at preset positions in each slot, for example, the TRS occupies the 5th symbol and the 9th symbol in one slot.

Figure 2:
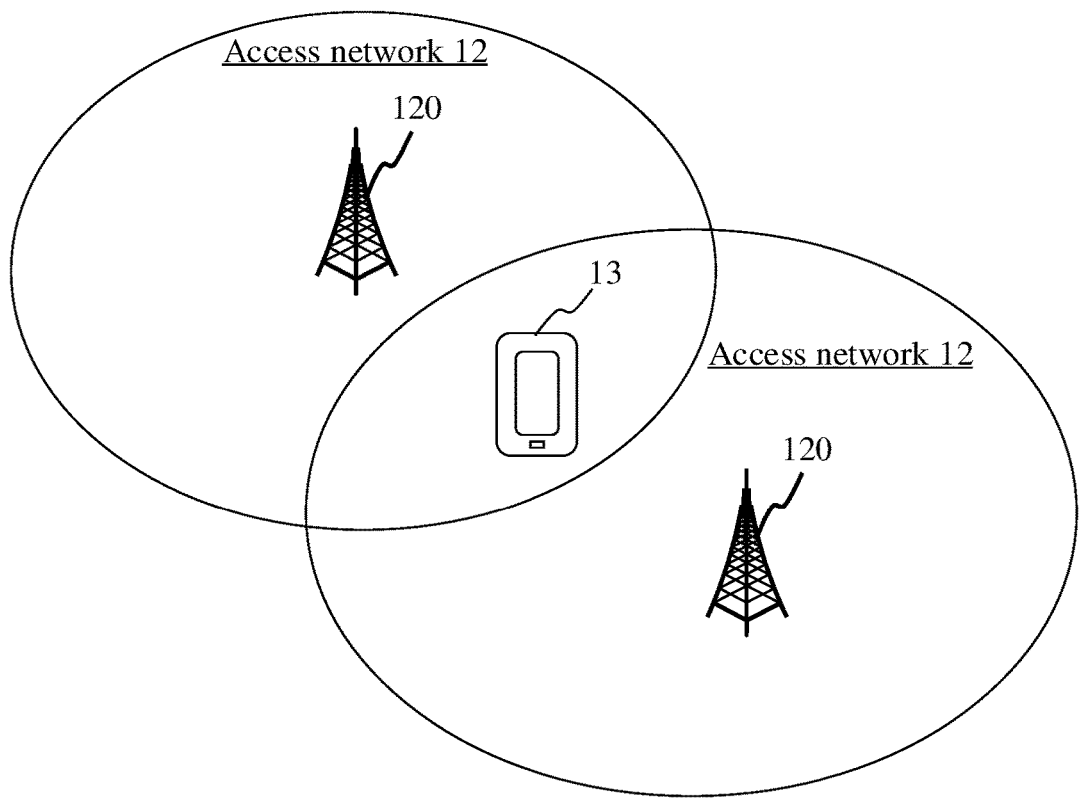
FIG. 2 shows a block diagram of a communication system provided by an exemplary embodiment of the present application.

FIG. 2 shows a block diagram of a communication system provided by an exemplary embodiment of the present application. The communication system may include: an access network 12 and a terminal 13.

The access network 12 includes several network devices 120. The network device 120 may be an apparatus that provides a radio communication function for the terminal. The network device 120 may be various forms of base stations (e.g., a macro base station, a micro base station, a relay station) or access points, and the like. In systems using different radio access technologies, the names of devices with base station functions may be different. For example, in the LTE system, they are called eNodeB or eNB; in the 5G NR-U system, they are called gNodeB or gNB. As communications technology evolves, the term "base station" may change. For the convenience of the embodiments of the present application, the above-mentioned apparatuses for providing the terminal 13 with a radio communication function are collectively referred to as an access network device.

The terminal 13 may include various handheld devices, vehicle-mounted devices, wearable devices, computing devices with radio communication functions or other processing devices connected to the wireless modem, as well as various forms of user equipment, Mobile Stations (MS), terminal (terminal device) and so on. For the convenience of description, the devices mentioned above are collectively referred to as a terminal. The access network device 120 and the terminal 13 communicate with each other through a certain air interface technology, such as a Uu interface.

The technical solutions of the embodiments of the present application may be applied to various communication systems, for example: a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD) system, an Advanced Long Term Evolution (LTE-A) system, a New Radio (NR) system, an NR system evolution system, an LTE-based access to unlicensed spectrum (LTE-U) system, an NR-U system, a Universal Mobile Telecommunication System (UMTS), a Worldwide Interoperability for Microwave Access (WiMAX) communication system, Wireless Local Area Networks (WLAN), Wireless Fidelity (WiFi), a next-generation communication system or other communication systems, etc.

Generally speaking, traditional communication systems support a limited number of connections, which are easy to be implemented. However, with the development of communication technology, the mobile communication system will not only support traditional communication, but also support, for example, Device to Device (D2D) communication, Machine to Machine (M2M) communication, Machine Type Communication (MTC), Vehicle to Vehicle (V2V) communication and Vehicle to Everything (V2X) system, etc. The embodiments of the present application may also be applied to these communication systems.

Figure 3:
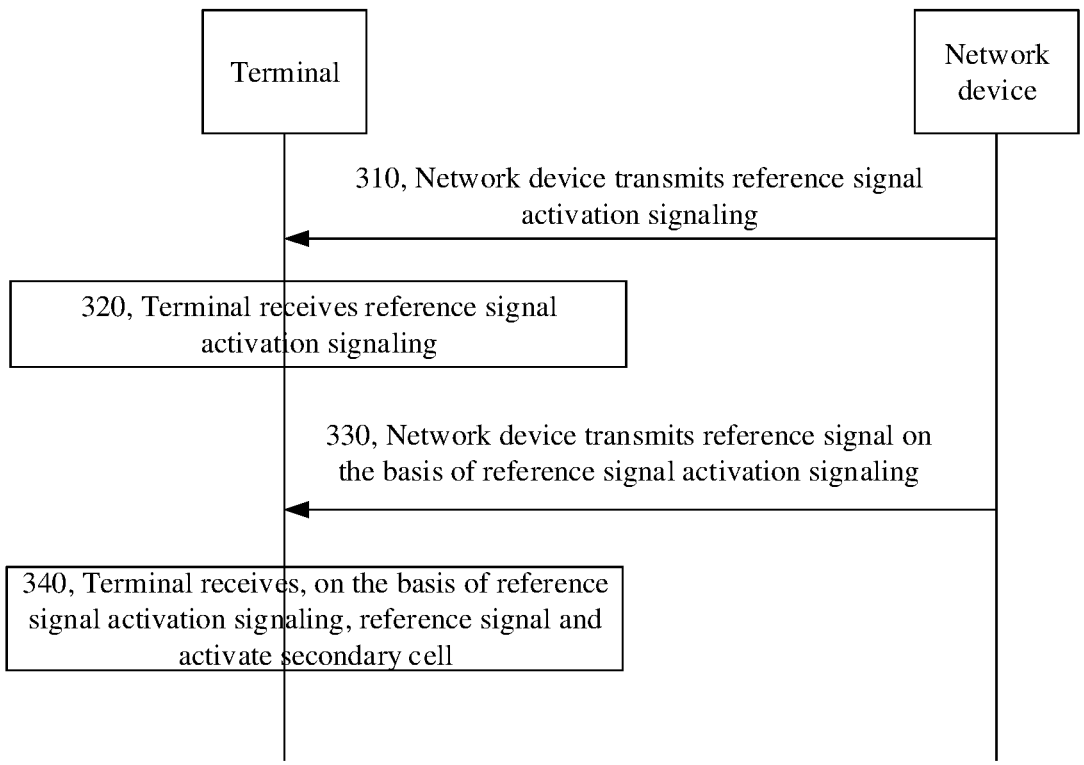
FIG. 3 shows a flowchart of a method for activating a secondary cell provided by an exemplary embodiment of the present application.

FIG. 3 shows a flowchart of a method for activating a secondary cell provided by an exemplary embodiment of the present application, which is applied to the terminal and the network device shown in FIG. 2, and the method includes at least part of the following contents.

In 310, the network device sends a reference signal activation signaling.

In 320, the terminal receives the reference signal activation signaling.

The reference signal activation signaling is used for activating a reference signal. In addition, the reference signal activation signaling may also be other types of signaling, and these signalings also have the function of activating the reference signal, which is not limited in the embodiments of the present application. The reference signal is used for activation of the secondary cell.

The embodiments of the present application are applied in a carrier aggregation scenario. If a plurality of carriers are aggregated through the carrier aggregation technology, the primary cell corresponds to one of the aggregated plurality of carriers, and the secondary cell corresponds to another of the aggregated plurality of carriers. When the carrier corresponding to the secondary cell needs to be used to transmit data, the network device sends the reference signal activation signaling to the terminal, and the reference signal can be activated through the reference signal activation signaling. The network device sends the reference signal, and then the terminal activates the secondary cell based on the reference signal sent by the network device, and transmits data by using the carrier corresponding to the secondary cell.

In some embodiments, the reference signal activation signaling is any one of Medium Access Control (MAC) Control Element (CE) or Downlink Control Information (DCI).

If the reference signal activation signaling is MAC CE, the network device sends the MAC CE, the terminal receives the MAC CE, determines the secondary cell to be activated subsequently, and then activates the secondary cell based on the received reference signal.

If the reference signal activation signaling is DCI, the network device sends the DCI, the terminal receives the DCI, determines the secondary cell to be activated subsequently, and then activates the secondary cell based on the received reference signal.

The reference signal in the embodiments of the present application is a Tracking Reference Signal (TRS).

In 330, the network device sends a reference signal based on the reference signal activation signaling.

In 340, the terminal receives the reference signal based on the reference signal activation signaling, and activates the secondary cell.

In the embodiments of the present application, after receiving the reference signal activation signaling, the terminal determines a time domain position of the reference signal based on the reference signal activation signaling, and then receives the reference signal based on the time domain position of the reference signal to activate the secondary cell.

First, the starting time domain position of the reference signal will be described.

In some embodiments, the terminal determines the starting time domain position of the reference signal based on the time domain position at which the reference signal activation signaling is sent, and starts receiving the reference signal at the starting time domain position of the reference signal.

The reference signal activation signaling includes two cases of MAC CE or DCI, then determining the starting time domain position of the reference signal also includes the following two cases:

(1) If the reference signal activation signaling is an MAC CE, the starting time domain position of the reference signal is a time domain position corresponding to a first preset duration after the moment when the MAC CE is sent.

If the terminal receives the MAC CE after the network device sends the MAC CE to the terminal, and the time domain position for sending the MAC CE is determined, and then the starting time domain position of the reference signal is determined based on the time domain position of the MAC CE, the network device sends the reference signal at the starting time domain position of the reference signal, and the terminal receives the reference signal at the starting time domain position.

The terminal receives the MAC CE and needs to process the MAC CE to obtain the information included in the MAC CE. The process of the MAC CE by the terminal requires the first preset duration. Therefore, the reference signal is received at a time domain position corresponding to the first preset duration after the time of sending the MAC CE.

The first preset duration is set by the network device, or set by the operator, or set by other methods. For example, the first preset duration is 40 milliseconds, 50 milliseconds, or other values.

In a possible implementation manner, the first preset duration is represented by a time unit, for example, the first preset duration is T time units. T is an integer. The time unit is a symbol or the time unit is a slot.

Or, the starting time domain position of the reference signal is a time domain position corresponding to a second preset duration after the moment when a confirmation message of the MAC CE is sent.

The confirmation message is a HARQ-ACK message. The terminal receives the MAC CE, parses the MAC CE, and the terminal also needs to return the confirmation message of the MAC CE to the network device, so it is determined that the time domain position corresponding to the second preset duration after the terminal sends the confirmation message of the MAC CE is the starting time domain position of the reference signal.

The second preset duration is set by the network device, or set by the operator, or set by other methods. For example, the second preset duration is 20 milliseconds, 30 milliseconds, or other values.

(2) If the reference signal activation signaling is DCI, the starting time domain position of the reference signal is a time domain position corresponding to a third preset duration after the moment when the DCI is sent.

If the terminal determines the starting time domain position of the reference signal based on the time domain position of the DCI after the network device sends the DCI to the terminal, the network device starts sending the reference signal at the starting time domain position, and the terminal starts receiving the reference signal at the starting time domain position.

After the terminal receives the DCI, it needs to process the DCI to obtain the information included in the DCI. The processing of the DCI by the terminal requires a certain period of time. Therefore, the terminal may receive the reference signal at the time domain position corresponding to the third preset duration after the moment of sending the DCI.

The third preset duration is determined by the following formula:

$$T_{proc}=N_1\cdot(2048+144)\cdot k\cdot 2^{-\mu}\cdot T_c$$

where $T_{proc}$ is the third preset duration, k and $T_c$ are constants, $\mu$=0, 1, 2, 3, $N_1$ is the processing time of PDSCH, and $N_1$ is set by the network device, or set by the operator, or set in other ways. For example, k is 64 and $T_c$ is $1/1966080000$. In some embodiments, if the subcarrier spacing is 15 KHz (kilohertz), then $\mu$ is 0, if the subcarrier spacing is 30 KHz, then $\mu$ is 1, if the subcarrier spacing is 60 KHz, then $\mu$ is 2, if the subcarrier spacing is 120 KHz, then $\mu$ is 3.

In a possible implementation manner, the third preset duration is represented by a time unit, for example, the third preset duration is N time units. N is an integer.

In addition, if the frequency range to which the secondary cell belongs is FR2 (referring to a frequency range, for example, 24250 MHz-52600 MHz), an interval between the time domain position of the DCI and the starting time domain position of the reference signal is not less than the third preset duration.

In the embodiments of the present application, the DCI is used as the reference signal activation signaling, and then the starting time domain position of the reference signal can be determined based on the time domain position where the DCI is sent. Since the terminal can complete the processing of the DCI, there is no need to improve the processing speed of the terminal, which reduces the complexity of the terminal and improves the processing rate of the reference signal.

In other embodiments, on the basis of determining the starting time domain position of the reference signal according to the reference signal activation signaling, it is also necessary to ensure that the starting time domain position of the reference signal overlaps with the time domain position of the SSB of the activated carrier.

In the embodiments of the present application, by aggregating a plurality of carriers through the carrier aggregation technology, the network device can activate different carriers and send or receive different information on different carriers. If the starting frequency domain position of the reference signal overlaps with the time domain position of the Synchronization Signal Block (SSB) of the activated carrier, the terminal can detect the reference signal and the SSB at the overlapping time domain position, and can consider a plurality of carriers at the same time, which improves the efficiency of receiving information by the terminal.

For example, the starting time domain position of the reference signal is in the same slot as the SSB, and the symbol where the reference signal is located is a subset or a universe set of symbols where the SSB is located.

In other embodiments, the starting time domain position of the reference signal is determined according to the state of the carrier corresponding to the secondary cell.

In the embodiments of the present application, since the state of the carrier corresponding to the secondary cell includes a plurality of states, the manners of determining the starting time domain position of the reference signal are different in different states.

The state of the carrier corresponding to the secondary cell is determined according to at least one of a measurement cycle of the secondary cell, a frequency range to which the secondary cell belongs, or whether the secondary cell is known.

The terminal determines the state of the carrier corresponding to the secondary cell. For example, if the secondary cell is unknown, it determines that the state of the carrier corresponding to the secondary cell is state 1, and if the frequency range to which the secondary cell belongs is FR1 (referring to a frequency range, for example, 450 MHz-6000 MHz), then it is determined that the state of the carrier corresponding to the secondary cell is state 2, or other states can also be determined.

Exemplarily, the embodiments of the present application include 9 types of state of carrier. The 9 types of states of carrier are shown in Table 1:

TABLE 1

| Number of state | State of carrier |
|---|---|
| 1 | If the secondary cell is known and belongs to FR1, and the measurement cycle of the secondary cell is equal to or smaller than 160 ms |
| 2 | If the secondary cell is known and belongs to FR1, and the measurement cycle of the secondary cell is larger than 160 ms |
| 3 | If the secondary cell is unknown and belongs to FR1, provided that the side condition conditions/Iot ≥-2 dB (ratio) is fulfilled |
| 4 | If the activated secondary cell belongs to FR2 and there is at least one active serving cell on the FR2 band, and SMTC for the target SCell is provided to the terminal, and The SSBs in the serving cell(s) and the SSBs in the SCell fulfill the condition defined in Section 3.6.3, The parameter ssb-PositionsInBurst is the same for the serving cell(s) and SCell |
| 5 | If the activated SCell belongs to FR2 and there is at least one active serving cell on the FR2 band, if the terminal is not provided with any SMTC for the target SCell The Reference Symbol (RS) of the activated SCell is Quasi Co-Location (QCL)-TypeD with RS(s) of one active serving cell on that FR2 frequency band |
| 6 | If the activated SCell belongs to FR2, and there is no active serving cell on the FR2 band provided that the primary cell (PCell) or the primary secondary cell (PSCell) is in FR1 or in FR2; if the target secondary cell (SCell) is known to the terminal and semi-persistent Channel State Information (CSI)-RS is used for CSI reporting. |

TABLE 1-continued

| Number of state | State of carrier |
|---|---|
| 7 | If the activated SCell belongs to FR2, and if there is no active serving cell on the FR2 band provided that PCell or PSCell is in FR1 or in FR2: If the target SCell is known to the terminal and semi-persistent CSI-RS is used for CSI reporting, if the target SCell is known to the terminal and periodic CSI-RS is used for CSI reporting. |
| 8 | If the PCell/PSCell and the target SCell are in a band pair with independent beam management, and the target SCell is unknown to the terminal, and the semi-persistent CSI-RS is used for CSI reporting, provided that the side condition $\hat{E}s/Iot \geq -2d$ B is fulfilled. |
| 9 | If the PCell/PSCell and the target SCell are in a band pair with independent beam management, and the target SCell is unknown to the terminal, and periodic CSI-RS is used for CSI reporting, provided that the side condition $\hat{E}s/Iot \geq -2$ db is fulfilled. |

On the basis of the 9 states based on Table 1, if it is determined that the state of the secondary cell is any one of state 2, state 3, state 6, state 7, state 8 or state 9, the determined starting time domain position of the reference signal is not only related to the time domain position of the reference signal activation signaling, but also needs to be guaranteed to overlap with the time domain position of the SSB.

If it is determined that the state of the secondary cell is either state 1 or state 4, the determined starting time domain position of the reference signal is related to the time domain position of the reference signal activation signaling.

If it is determined that the state of the secondary cell is state 5, it is not necessary to determine the starting time domain position of the reference signal.

The first point that needs to be explained is that the terminal and the network device in the embodiments of the present application both determine the starting time domain position of the reference signal by using the above manners.

The second point that needs to be explained is that the embodiments of the present application are only described by taking the terminal determining the starting time domain position of the reference signal according to the time domain position of the reference signal activation signaling as an example. In another embodiment, the starting time domain position of the reference signal can also be indicated by the network device, without the need for the terminal to determine based on the time domain position of the reference signal activation signaling.

In the above-mentioned embodiment, the description has been given on how to determine the starting time domain position of the reference signal. Next, how to determine the time domain length of the reference signal will be described.

In the embodiments of the present application, the time domain length of the reference signal can be determined in the following three ways:

(1) The time domain length of the reference signal is determined according to the state of the carrier.

(2) The time domain length of the reference signal is indicated by a reference signal configuration signaling sent by the network device.

(3) The time domain length of the reference signal is a preset length.

The time domain length of the reference signal is used to represent the number of time domain positions corresponding to the reference signal. For example, the reference signal occupies 4 time domain positions, or the reference signal occupies 6 time domain positions, or the reference signal occupies other number of time domain positions.

The time domain length of the reference signal is represented by the number of time domain units, or the time domain length of the reference signal is represented by the number of times of repeated transmission of the reference signal.

For example, if the time domain length of the reference signal is represented by symbols, the number of time domain positions occupied by the reference signal is the same as the number of the symbols. If the time domain length of the reference signal is represented by slots, the number of time domain positions occupied by the reference signal is twice the number of slots. If the time domain length of the reference signal is represented by the number of repeated transmissions of the reference signal, the number of time domain positions occupied by the reference signal is four times the number of repeated transmissions.

It should be noted that the embodiments of the present application only take the number of repeated transmissions or the number of time domain units to represent the time domain length of the reference signal as an example for description, and the present application is not limited to the above-mentioned methods, and other methods can also be used to represent the time domain length of the reference signal.

When the time domain length of the reference signal is determined by way (1), for the time-frequency synchronization function, a plurality of time domain positions of the reference signal are required, and time-frequency synchronization is realized according to a difference between the plurality of time domain positions. Or, for the frequency gain control function, if the reference signal is one symbol, the frequency gain control can be completed, and if the reference signal is a plurality of symbols, the frequency gain control can also be completed. Then, in the above way, the time domain length of the reference signal can be determined according to the states of the carriers of different secondary cells.

Next, on the basis of the 9 states shown in Table 1 above, the time domain length of the reference signal shown in Table 2 can be determined:

TABLE 2

| Number of state | State of carrier | Number of symbols occupied by reference signal | Number of slots for configuring reference signal | Usage |
|---|---|---|---|---|
| 1 | If the secondary cell is known and belongs to FR1, and the measurement cycle of the secondary cell is equal to or smaller than 160 ms | 4 | 2 | Time-frequency synchronization |
| 2 | If the secondary cell is known and belongs to FR1, and the measurement cycle of the secondary cell is larger than 160 ms | 6 | 3 | AGC setting and time-frequency synchronization |
| 3 | If the secondary cell is unknown and belongs to FR1, provided that the side condition conditions/Iot ≥-2 dB is fulfilled | 8 | 4 | AGC setting and time-frequency synchronization |
| 4 | If the activated secondary cell belongs to FR2 and there is at least one active serving cell on the FR2 band, and SMTC for the target SCell is provided to the terminal, and The SSBs in the serving cell(s) and the SSBs in the SCell fulfill the condition defined in clause 3.6.3, The parameter ssb-PositionsInBurst is same for the serving cell(s) and the SCell | 4 | 2 | Time-frequency synchronization |
| 5 | If the activated SCell belongs to FR2 and there is at least one active serving cell on the FR2 band, if the terminal is not provided with any SMTC for the target SCell the RS(s) of the activated SCell is(are) QCL-TypeD with RS(s) of one active serving cell on that FR2 band | 0 | 0 | None |
| 6 | If the activated SCell belongs to FR2, and there is no active serving cell on the FR2 band provided that PCell or PSCell is in FR1 or in FR2: If the target SCell is known to the terminal and semi-persistent CSI-RS is used for CSI reporting | 6 | 3 | AGC setting and time-frequency synchronization |
| 7 | If the activated SCell belongs to FR2, and if there is no active serving cell on the FR2 band provided that PCell or PSCell is in FR1 or in FR2: If the target SCell is known to the terminal and semi-persistent CSI-RS is used for CSI reporting. If the target SCell is known to the terminal and periodic CSI-RS is used for CSI reporting | 6 | 3 | AGC setting and time-frequency synchronization |
| 8 | If the PCell/PSCell and the target SCell are in a band pair with independent beam management, and the target SCell is unknown to the terminal, and semi-persistent CSI-RS is used for CSI reporting, provided that the side condition Ês/Iot ≥-2 dB is fulfilled | 48 | 24 | AGC setting and time-frequency synchronization of a plurality of beams |
| 9 | If the PCell/PSCell and the target SCell are in a band pair with independent beam management, and the target SCell is unknown to the terminal, and periodic CSI-RS is used for CSI reporting, provided that the side condition Ês/Iot ≥-2 dB is fulfilled | 48 | 24 | AGC setting and time-frequency synchronization of a plurality of beams |

When the time domain length of the reference signal is determined by way (2), the terminal does not need to determine the time domain length of the reference signal based on the state of the carrier of the secondary cell, the network device can send the reference signal configuration signaling to the terminal, and the terminal receives the reference signal configuration signaling, and determines the time domain length of the reference signal based on the reference signal configuration signaling.

When the time domain length of the reference signal is determined by way (3), the time domain length of the reference signal determined by the terminal is a preset length.

The preset length is set by the network device, or set by the operator, or set by other ways. The above preset length is just an example, and may be other values in practical applications.

In the embodiments of the present application, regardless of the state of the carrier of the secondary cell, the time domain length of the reference signal is determined as the preset length, which reduces the operation of the terminal for determining the time domain length of the reference signal, and improves the efficiency of determining the time domain length of the reference signal.

Next, how to determine the time domain position of the reference signal will be described.

The time domain position of the reference signal is determined according to the state of the carrier corresponding to the secondary cell. The state of the carrier corresponding to the secondary cell is determined according to at least one of a measurement cycle of the secondary cell, a frequency range to which the secondary cell belongs, or whether the secondary cell is known.

If the state of the carrier corresponding to the secondary cell is that the time domain synchronization is completed according to the reference signal, it is determined that there is an interval between the time domain positions of the reference signal, or the reference signal includes a reference signal used for frequency gain control setting and a reference signal used for time-frequency synchronization, if the state of the carrier is to complete time domain synchronization and frequency gain control setting according to the reference signal, the reference signal used for frequency gain control setting is adjacent to the reference signal used for time-frequency synchronization.

In addition, since the state of the carrier is different, the dependence of the terminal on the reference signal is also different. For different carrier states, the number of time domain positions of the reference signal and the interval of the time domain positions are also different.

For example, for state 1, the terminal completes time-frequency synchronization according to the reference signal, and there is an interval between the time domain positions of the reference signal.

For state 2, the terminal completes time domain synchronization and frequency gain control according to the reference signal. In order to reduce the delay and avoid repeated frequency gain control settings, the reference signal used for frequency gain control is adjacent to the reference signal used for time-frequency synchronization, and there is an interval between the time domain positions of the reference signal used for time-frequency synchronization.

For state 3, the terminal completes time domain synchronization and frequency gain control according to the reference signal, and the frequency gain control needs to be set multiple times, so a plurality of reference signals are required. The plurality of reference signals used for frequency gain control are adjacent, and there is an interval between the plurality of reference signals used for time-frequency synchronization.

For state 4, the terminal completes time-frequency synchronization according to the reference signal, and there is an interval between the time domain positions of the reference signal.

For state 5, the terminal does not need to receive the reference signal.

For state 6, the terminal completes time domain synchronization and frequency gain control according to the reference signal. In order to reduce the delay and avoid repeated frequency gain control settings, the reference signal used for frequency gain control is adjacent to the reference signal used for time-frequency synchronization, and there is an interval between the time domain positions of the reference signal used for time-frequency synchronization.

For state 7, the terminal completes time domain synchronization and frequency gain control according to the reference signal. In order to reduce the delay and avoid repeated frequency gain control settings, the reference signal used for frequency gain control is adjacent to the reference signal used for time-frequency synchronization, and there is an interval between the time domain positions of the reference signal used for time-frequency synchronization.

For state 8, for the same beam (with QCL Type D relationship between signals), it is the same as state 3. A plurality of beams are repeatedly mapped on different symbols. There is a certain interval between different beams to meet the time for beam switching.

For state 9, for the same beam (with QCL Type D relationship between signals), it is the same as state 3. A plurality of beams are repeatedly mapped on different symbols. There is a certain interval between different beams to meet the time for beam switching.

For example, taking the states in Table 1 and the reference signal as TRS as an example, Table 3 shows the time domain position of the reference signal corresponding to each state, and the value of x is 5:

TABLE 3

| Number of state | First column of TRS | Second column of TRS | Third column of TRS | Fourth column of TRS |
| --- | --- | --- | --- | --- |
| 1 | X | X + 5 | 0 | 0 |
| 2 | X | X + 1 | X + 5 | 0 |
| 3 | X | X + 1 | X + 2 | X + 6 |
| 4 | X | X + 5 | 0 | 0 |
| 5 | 0 | 0 | 0 | 0 |
| 6 | X | X + 1 | X + 5 | 0 |
| 7 | X | X + 1 | X + 5 | 0 |
| 8 | X | X + 1 | X + 2 | X + 6 |
| 9 | X | X + 1 | X + 2 | X + 6 |

In other embodiments, the time domain position of the reference signal is a slot occupied by the reference signal and/or a preset position in the slot.

In the embodiments of the present application, if the carriers corresponding to the secondary cell all satisfy the above conditions, each time domain position of the reference signal is determined by using the existing format of the time domain position of the reference signal. For example, as shown in Table 4, the time domain position of the reference signal occupies the 5th symbol and the 9th symbol in the slot, and the value of x is 5.

TABLE 4

| Number of state | First column of TRS | Second column of TRS | Third column of TRS | Fourth column of TRS | Fifth column of TRS | Sixth column of TRS | Seventh column of TRS | Eighth column of TRS |
| --- | --- | --- | --- | --- | --- | --- | --- | --- |
| 1 | X | X + 4 | X + 14 | X + 18 | 0 | 0 | 0 | 0 |
| 2 | X | X + 4 | X + 14 | X + 18 | X + 28 | X + 32 | 0 | 0 |
| 3 | X | X + 4 | X + 14 | X + 18 | X + 28 | X + 32 | X + 42 | X + 46 |
| 4 | X | X + 4 | X + 14 | X + 18 | 0 | 0 | 0 | 0 |

TABLE 4-continued

| Number of state | First column of TRS | Second column of TRS | Third column of TRS | Fourth column of TRS | Fifth column of TRS | Sixth column of TRS | Seventh column of TRS | Eighth column of TRS |
|---|---|---|---|---|---|---|---|---|
| 5 | 0 | 0 | 0 | 0 | 0 | 0 | 0 | 0 |
| 6 | X | X + 4 | X + 14 | X + 18 | X + 28 | X + 32 | 0 | 0 |
| 7 | X | X + 4 | X + 14 | X + 18 | X + 28 | X + 32 | 0 | 0 |
| 8 | X | X + 4 | X + 14 | X + 18 | X + 28 | X + 32 | Perform 8 cycles | |
| 9 | X | X + 4 | X + 14 | X + 18 | X + 28 | X + 32 | Perform 8 cycles | |

If the starting time domain position of the reference signal does not overlap with the time domain position of the SSB of the activated carrier, an offset is performed on the starting time domain position of the reference signal, and the time domain position of the reference signal after offset overlaps with the time domain position of the SSB.

In other embodiments, if the reference signal has a quasi-co-located relationship with the SSB or CSI RS, the measurement related to the SSB or CSI can be performed according to the reference signal.

The quasi-co-location relationship includes four types, namely, a quasi-co-location relationship of type A, a quasi-co-location relationship of type B, a quasi-co-location relationship of type C, and a quasi-co-location relationship of type D.

The quasi-co-location relationship of type A has the characteristics of Doppler frequency shift, Doppler spread, average delay and delay spread, and the quasi-co-location relationship of type B has the characteristics of Doppler frequency shift and Doppler spread, the quasi-co-location relationship of type C has the characteristics of Doppler frequency shift and average delay, and the quasi-co-location relationship of type D has the characteristics of spatial reception parameter.

(1) If the reference signal and the SSB have a quasi-co-location relationship, the SSB is detected according to the reference signal.

The reference signal and the SSB have a quasi-co-location relationship of type C, or a quasi-co-location relationship of type C and type D.

(2) If the reference signal and the channel state indication reference signal (CSI RS) used for the channel state indication (CSI) measurement have a quasi-co-located relationship, CSI measurement is performed according to the reference signal.

The reference signal and the CSI RS have a quasi-co-location relationship of type A, or a quasi-co-location relationship of type B, or a quasi-co-location relationship of type A and type D.

It should be noted that, the embodiments of the present application only take the reference signal and SSB or CSI measurement having a quasi-co-location relationship as an example for description. In another embodiment, the reference signal does not have a quasi-co-location relationship with the SSB or CSI, and the reference signal received by the terminal is only used for frequency gain control or time-frequency synchronization.

With the method provided by the embodiments of the present application, the terminal can receive the reference signal based on the reference signal activation signaling, and then activate the secondary cell, without waiting for the first SSB to activate the secondary cell, reducing the time for waiting to receive the first SSB, and thus reducing the time delay of activating the secondary cell, and improving the accuracy of activating the secondary cell.

In addition, the terminal activates the secondary cell according to the received reference signal without parsing the SSB, which reduces the processing resource consumed in the parsing process, thereby saving the resource of the terminal.

In addition, the starting resource position of the reference signal, the time domain length of the reference signal and the time domain position of the reference signal are respectively defined, which ensures that the reference signal can activate the secondary cell in any scenario and improves the efficiency of activating the secondary cell.

Moreover, the time domain length of the reference signal can be determined in various ways, which improves the flexibility of determining the reference signal, and further improves the flexibility of activating the secondary cell.

Figure 4:
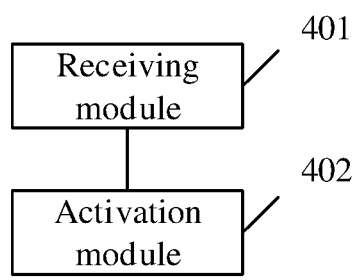
FIG. 4 shows a block diagram of an apparatus for activating a secondary cell provided by an exemplary embodiment of the present application.

FIG. 4 shows a block diagram of an apparatus for activating a secondary cell provided by an exemplary embodiment of the present application. The apparatus is applied to a terminal, and the apparatus includes:
a receiving module 401, configured to receive a reference signal activation signaling, where the reference signal activation signaling is used for activating a reference signal, and the reference signal is used for activation of the secondary cell;
a receiving module 401, configured to receive the reference signal based on the reference signal activation signaling;
an activation module 402, configured to activate the secondary cell.

With the apparatus provided by the embodiment of the present application, the terminal can receive the reference signal based on the reference signal activation signaling, and then activate the secondary cell, without waiting for the first SSB to activate the secondary cell, reducing the time for waiting to receive the first SSB, and thus reducing the time delay of activating the secondary cell, and improving the accuracy of activating the secondary cell.

In some embodiments, the reference signal activation signaling is any one of MAC CE or DCI.

In some embodiments, the reference signal activation signaling is MAC CE, and the starting time domain position of the reference signal is a time domain position corresponding to a first preset duration after the moment when the MAC CE is sent; or, the starting time domain position of the reference signal is a time domain position corresponding to a second preset duration after the moment when a confirmation message of the MAC CE is sent.

In some embodiments, the reference signal activation signaling is DCI, and the starting time domain position of the reference signal is a time domain position corresponding to a third preset duration after the moment when the DCI is sent.

In some embodiments, the third preset duration is determined by the following formula:

$$T_{proc} = N_1 \cdot (2048 + 144) \cdot k \cdot 2^{-\mu} \cdot T_c$$

where $T_{proc}$ is the third preset duration, k and $T_c$ are constants, μ=0, 1, 2, 3, and N1 is the processing time of PDSCH.

In some embodiments, the starting time domain position of the reference signal overlaps with the time domain position of the SSB of the activated carrier.

In some embodiments, the starting time domain position of the reference signal is determined according to the state of the carrier corresponding to the secondary cell.

In some embodiments, the time domain length of the reference signal is determined according to the state of the carrier corresponding to the secondary cell, or the time domain length of the reference signal is indicated by a reference signal configuration signaling sent by the network device, or the time domain length of the reference signal is a preset length.

In some embodiments, the time domain length of the reference signal is represented by the number of time domain units, or the time domain length of the reference signal is represented by the number of repeated transmissions of the reference signal.

In some embodiments, the time domain unit is a symbol, or the time domain unit is a slot.

In some embodiments, the time domain position of the reference signal is determined according to the state of the carrier corresponding to the secondary cell.

In some embodiments, the time domain position of the reference signal is a slot occupied by the reference signal and/or a preset position in the slot.

Figure 5:
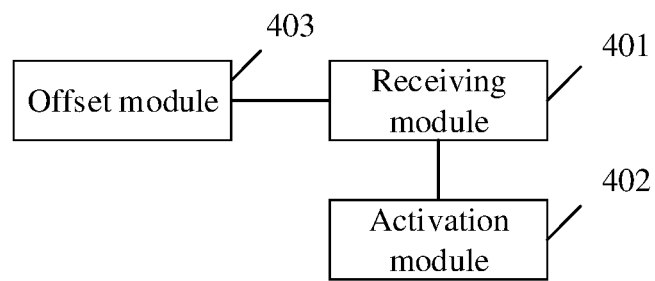
FIG. 5 shows a block diagram of an apparatus for activating a secondary cell provided by an exemplary embodiment of the present application.

In some embodiments, referring to FIG. 5, the apparatus further includes:

an offset module 403, configured to perform an offset on the starting time domain position of the reference signal if the starting time domain position of the reference signal does not overlap with the time domain position of the SSB of the activated carrier, where the time domain position of the reference signal after offset overlaps with the time domain position of the SSB of the activated carrier.

In some embodiments, the state of the carrier corresponding to the secondary cell is determined according to at least one of a measurement cycle of the secondary cell, a frequency range to which the secondary cell belongs, or whether the secondary cell is known.

In some embodiments, the reference signal is a tracking reference signal (TRS).

Regarding the apparatuses in the above-mentioned embodiments, the specific manners in which each module performs operations have been described in detail in the embodiments of the method, which will not be described in detail here.

The above-mentioned activation module 402 or offset module 403 may also be a processing module, and may be a processor in specific implementation. The above receiving module 401 may be a receiver or a transceiver during specific implementation.

Figure 6:
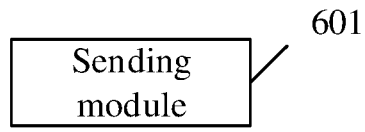
FIG. 6 shows a block diagram of an apparatus for activating a secondary cell provided by an exemplary embodiment of the present application.

FIG. 6 shows a block diagram of an apparatus for activating a secondary cell provided by an exemplary embodiment of the present application. The apparatus is applied to a network device, and the apparatus includes:

a sending module 601, configured to send a reference signal activation signaling, where the reference signal activation signaling is used for activating a reference signal, and the reference signal is used for activation of the secondary cell;

a sending module 601, configured to send the reference signal based on the reference signal activation signaling.

With the apparatuses provided by the embodiments of the present application, the terminal can receive the reference signal based on the reference signal activation signaling, and then activate the secondary cell, without waiting for the first SSB to activate the secondary cell, reducing the time for waiting to receive the first SSB, thereby reducing the time delay of activating the secondary cell, and improving the accuracy of activating the secondary cell.

In some embodiments, the reference signal activation signaling is any one of MAC CE or DCI.

In some embodiments, the reference signal activation signaling is MAC CE, and the starting time domain position of the reference signal is the time domain position corresponding to the first preset duration after the time when the MAC CE is sent; or, the starting time domain position of the reference signal is the time domain position corresponding to the second preset duration after the moment when the confirmation message of the MAC CE is sent.

In some embodiments, the reference signal activation signaling is DCI, and the starting time domain position is a time domain position corresponding to a third preset duration after the moment when the DCI is sent.

In some embodiments, the third preset duration is determined by the following formula:

$$T_{proc}=N_1 \cdot (2048+144) \cdot k \cdot 2^{-\mu} \cdot T_c$$

wherein $T_{proc}$ is the third preset duration, k and $T_c$ are constants, μ=0, 1, 2, 3, and N1 is a processing time of PDSCH.

In some embodiments, the starting time domain position of the reference signal overlaps with the time domain position of the SSB of the activated carrier.

In some embodiments, the starting time domain position of the reference signal is determined according to the state of the carrier corresponding to the secondary cell.

In some embodiments, the time domain length of the reference signal is determined according to the state of the carrier corresponding to the secondary cell, or the time domain length of the reference signal is indicated by the reference signal configuration signaling sent by the network device, or the time domain length of the reference signal is the preset length.

In some embodiments, the time domain length of the reference signal is represented by the number of time domain units, or the time domain length of the reference signal is represented by the number of repeated transmissions of the reference signal.

In some embodiments, the time domain units are symbols, or alternatively, the time domain units are slots.

In some embodiments, the time domain position of the reference signal is determined according to the state of the carrier corresponding to the secondary cell.

In some embodiments, the time domain position of the reference signal is a slot occupied by the reference signal and/or a preset position in the slot.

Figure 7:
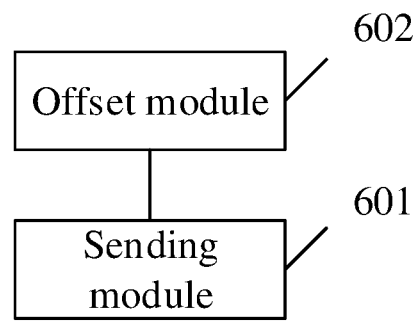
FIG. 7 shows a block diagram of an apparatus for activating a secondary cell provided by an exemplary embodiment of the present application.

In some embodiments, referring to FIG. 7, the apparatus further includes:

an offset module 602, configured to perform an offset on the starting time domain position of the reference signal if the starting time domain position of the reference signal does not overlap with the time domain position of the SSB of the activated carrier, where the time domain position of the reference signal after offset overlaps with the time domain position of the SSB of the activated carrier.

In some embodiments, the state of the carrier corresponding to the secondary cell is determined according to at least one of a measurement cycle of the secondary cell, a frequency range to which the secondary cell belongs, or whether the secondary cell is known.

In some embodiments, the reference signal is a tracking reference signal (TRS).

Regarding the apparatus in the above-mentioned embodiments, the specific manner in which each module performs operations has been described in detail in the embodiments of the method, which will not be described in detail here.

The above offset module 602 may also be a processing module, and may be a processor in specific implementation. The above-mentioned sending module 601 may be a transmitter or a transceiver during specific implementation.

Figure 8:
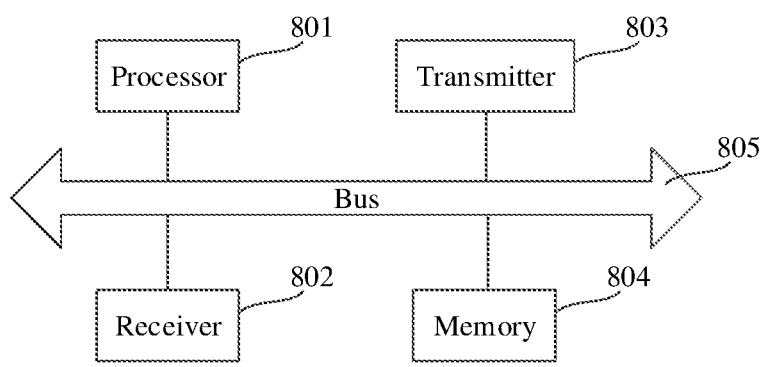
FIG. 8 shows a schematic structural diagram of a communication device provided by an exemplary embodiment of the present application.

FIG. 8 shows a schematic structural diagram of a communication device provided by an exemplary embodiment of the present application. The communication device includes: a processor 801, a receiver 802, a transmitter 803, a memory 804, and a bus 805.

The processor 801 includes one or more processing cores, and the processor 801 executes various functional applications and information processing by running software programs and modules.

The receiver 802 and the transmitter 803 may be implemented as one communication component.

The memory 804 is connected to the processor 801 through the bus 805.

The memory 804 may be configured to store at least one program code, and the processor 801 is configured to execute the at least one program code, so that the communication device implements each step in the above method embodiments.

Furthermore, the communication device may be a terminal or a base station. The memory 804 may be implemented by any type or combination of volatile or non-volatile storage devices including, but not limited to: a magnetic disk or an optical disk, an electrically erasable programmable read-only Memory (EEPROM), an Erasable Programmable Read Only Memory (EPROM), a Static Random Access Memory (SRAM), a Read Only Memory (ROM), a magnetic memory, a flash memory, a Programmable Read Only Memory (PROM).

In an exemplary embodiment, a computer-readable storage medium is also provided, in which executable program code is stored, and the executable program code is loaded and executed by the processor to implement the method for activating a secondary cell performed by the communication device provided by the above individual method embodiments.

Those of ordinary skill in the art can understand that all or part of the steps of implementing the above embodiments can be completed by hardware, or can be completed by instructing relevant hardware through a program, and the program can be stored in a computer-readable storage medium. The storage medium mentioned may be a read-only memory, a magnetic disk or an optical disk, etc.

The above descriptions are only optional embodiments of the present application, and are not intended to limit the present application. Any modifications, equivalent replacements, improvements, etc. made within the spirit and principles of the present application shall be included in the protection scope of the present application.

What is claimed is:

1. A method for activating a secondary cell, applied to a terminal, the method comprising:

receiving a reference signal activation signaling, wherein the reference signal activation signaling is used for activating a reference signal, and the reference signal is used for activation of the secondary cell; and receiving the reference signal based on the reference signal activation signaling, and activating the secondary cell, wherein:

the reference signal activation signaling is any one of an MAC CE or a DCI, wherein a time domain length of the reference signal is indicated by a reference signal configuration signaling sent by a network device, wherein the time domain length of the reference signal is represented by a number of repeated transmissions of the reference signal, and a number of time domain positions occupied by the reference signal is four times the number of repeated transmissions.

2. The method of claim 1, wherein:

the reference signal activation signaling is the MAC CE, and a starting time domain position of the reference signal is a time domain position corresponding to a first preset duration after a moment when the MAC CE is sent; or, the starting time domain position of the reference signal is a time domain position corresponding to a second preset duration after a moment when a confirmation message of the MAC CE is sent.

3. The method of claim 1, wherein the reference signal is a tracking reference signal (TRS).

4. A method for activating a secondary cell, applied to a network device, the method comprising:

sending a reference signal activation signaling, wherein the reference signal activation signaling is used for activating a reference signal, and the reference signal is used for activation of the secondary cell; and sending the reference signal based on the reference signal activation signaling, wherein:

the reference signal activation signaling is any one of an MAC CE or a DCI, wherein a time domain length of the reference signal is indicated by a reference signal configuration signaling sent by the network device, wherein the time domain length of the reference signal is represented by a number of repeated transmissions of the reference signal, and a number of time domain positions occupied by the reference signal is four times the number of repeated transmissions.

5. The method of claim 4, wherein:

the reference signal activation signaling is the MAC CE, and a starting time domain position of the reference signal is a time domain position corresponding to a first preset duration after a moment when the MAC CE is sent; or, the starting time domain position of the reference signal is a time domain position corresponding to a second preset duration after a moment when a confirmation message of the MAC CE is sent.

6. The method of claim 4, wherein the reference signal is a tracking reference signal (TRS).

7. An apparatus for activating a secondary cell, applied to a terminal, the apparatus comprising:

a processor;

a transceiver connected to the processor; and a memory for storing executable program codes for the processor;

wherein the processor is configured to load and execute the executable program codes to enable the terminal to:

receive a reference signal activation signaling, wherein the reference signal activation signaling is used for activating a reference signal, and the reference signal is used for activation of the secondary cell;

receive the reference signal based on the reference signal activation signaling, and activate the secondary cell, wherein:

the reference signal activation signaling is any one of an MAC CE or a DCI, wherein a time domain length of the reference signal is indicated by a reference signal configuration signaling sent by a network device, wherein the time domain length of the reference signal is represented by a number of repeated transmissions of the reference signal, and a number of time domain positions occupied by the reference signal is four times the number of repeated transmissions.

8. The apparatus of claim 7, wherein:

the reference signal activation signaling is the MAC CE, and a starting time domain position of the reference signal is a time domain position corresponding to a first preset duration after a moment when the MAC CE is sent; or, the starting time domain position of the reference signal is a time domain position corresponding to a second preset duration after a moment when a confirmation message of the MAC CE is sent.

9. The apparatus of claim 7, wherein the reference signal is a tracking reference signal (TRS).

10. An apparatus for activating a secondary cell, applied to network device, the apparatus comprising:

a processor;

a transceiver connected to the processor; and a memory for storing executable program codes for the processor;

wherein the processor is configured to load and execute the executable program codes to enable the network device to:

send a reference signal activation signaling, wherein the reference signal activation signaling is used for activating a reference signal, and the reference signal is used for activation of the secondary cell;

send the reference signal based on the reference signal activation signaling, wherein:

the reference signal activation signaling is any one of an MAC CE or a DCI, wherein a time domain length of the reference signal is indicated by a reference signal configuration signaling sent by the network device, wherein the time domain length of the reference signal is represented by a number of repeated transmissions of the reference signal, and a number of time domain positions occupied by the reference signal is four times the number of repeated transmissions.

11. The apparatus of claim 10, wherein:

the reference signal activation signaling is the MAC CE, and a starting time domain position of the reference signal is a time domain position corresponding to a first preset duration after a moment when the MAC CE is sent; or, the starting time domain position of the reference signal is a time domain position corresponding to a second preset duration after a moment when a confirmation message of the MAC CE is sent.

12. The apparatus of claim 10, wherein the reference signal is a tracking reference signal (TRS).

* * * * *